United States Patent
Moore et al.

(10) Patent No.: US 10,812,325 B1
(45) Date of Patent: Oct. 20, 2020

(54) SERVICE BANDWIDTH PROVISIONING ON PASSIVE OPTICAL NETWORKS

(71) Applicant: AT&T Intellectual Property I, L.P., Atlanta, GA (US)

(72) Inventors: Thomas Moore, Dallas, TX (US); Timothy E. Bates, Plano, TX (US); Edward Walter, Boerne, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/423,777

(22) Filed: May 28, 2019

(51) Int. Cl.
| | |
|---|---|
| H04L 12/24 | (2006.01) |
| H04B 10/27 | (2013.01) |
| H04B 10/25 | (2013.01) |
| H04B 10/60 | (2013.01) |
| H04B 10/272 | (2013.01) |
| H04B 10/40 | (2013.01) |
| H04B 10/50 | (2013.01) |

(52) U.S. Cl.
CPC ......... *H04L 41/0806* (2013.01); *H04B 10/25* (2013.01); *H04B 10/27* (2013.01); *H04B 10/272* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 5,920,410 A * | 7/1999 | Smith | H04Q 11/0062 398/59 |
| 2008/0232804 A1 * | 9/2008 | Absillis | H04J 3/14 398/71 |
| 2010/0183304 A1 * | 7/2010 | Spector | H04J 3/1694 398/66 |
| 2011/0318009 A1 * | 12/2011 | Shiba | H04L 12/2885 398/67 |
| 2013/0291034 A1 * | 10/2013 | Basile | H04N 17/004 725/107 |
| 2015/0055955 A1 * | 2/2015 | Kim | H04J 14/0239 398/69 |

* cited by examiner

*Primary Examiner* — Darren E Wolf
(74) *Attorney, Agent, or Firm* — BakerHostetler (57) ABSTRACT

Methods and systems for provisioning different services on passive optical networks or forecasting service profiles for passive optical networks. The provisioning may be based on location, guaranteed bandwidth, or the like.

20 Claims, 7 Drawing Sheets

SERVICE BANDWIDTH PROVISIONING ON PASSIVE OPTICAL NETWORKS

BACKGROUND

A passive optical network (PON) is a form of fiber-optic access network. A passive optical network (PON) is a telecommunications technology used to provide fiber to the end consumer, which may include residential and commercial. A distinguishing feature of a PON is that it implements a point-to-multipoint architecture, in which unpowered fiber optic splitters may be used to enable a single optical fiber to serve multiple end-points. The end-points may be individual residential consumers or commercial consumers. A PON does not have to provision individual fibers between the hub and customer. Passive optical networks are often referred to as the last mile between a service provider and consumer. This disclosure is directed to addressing issues in PON technology.

SUMMARY

The disclosed subject matter provides for methods and systems for mixing different services on PONs, which may affect the addressable customers and services in fiber serving areas.

In an example, an apparatus may include a processor and a memory coupled with the processor that effectuates operations. The operations may include obtaining a request for provisioning a service (e.g., a service profile), wherein the request comprises a location; based on the request, determining passive optical networks (PONs) that are available for the location; determining a subset of the PONs that have the capacity to provision the service; selecting a first PON of the subset of PONs based on one or more factors, wherein the one or more factors comprises guaranteed bandwidth; and automatically provisioning the service on the first PON.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

A problem with planning and optimizing services over passive optical networks (PONs) is that systems and methods to configure services on the PON may not optimize the bandwidth resources of a PON for multiple services, and for a flexible mix of customers across these multiple services. Without the ability to plan and optimize the bandwidth and resources of a PON for multiple services, the planning function typically simplifies logic to allocate a PON to only residential services, or only to business services, or a static rule for a mix of the number of residential and business services on a PON. Conventionally, service providers put business subscribers on one fiber and residential customers on another subscriber. In some implementations there may be a mix of residential and business on one fiber, but it is usually somewhat of an arbitrary guess of placing a maximum number of X business customers and a maximum number of Y residential customers, which can be inefficient. The conventional approach usually uses more PONs and thus more fibers than the disclosed approach which may dynamically mix services with very different traffic descriptors (e.g., service profiles) enabled on the same PON.

Figure 1:
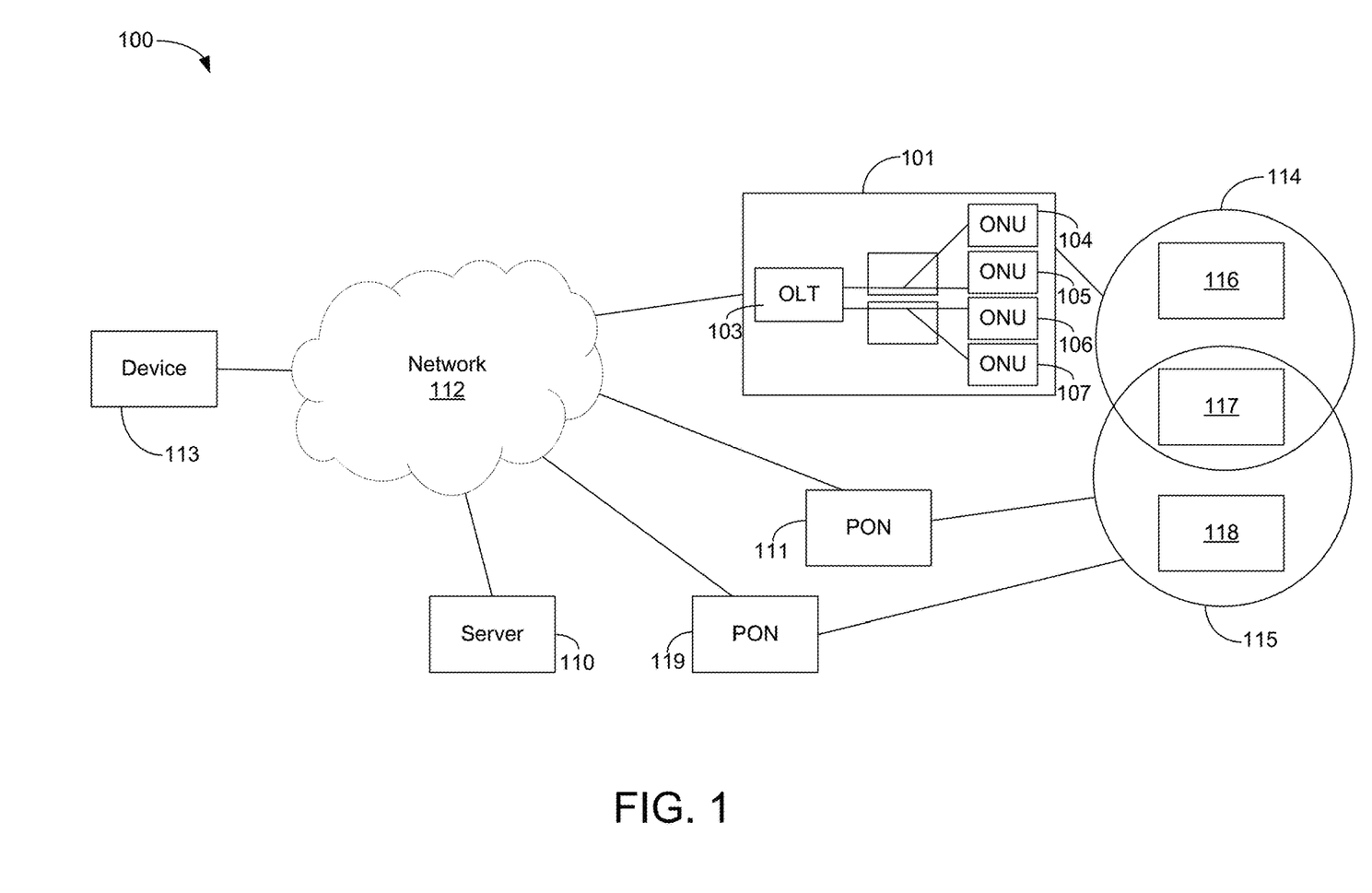
FIG. 1 illustrates an exemplary service provider network.

FIG. 1 illustrates an exemplary service provider network 100, which may include one or more PONs. Network 100 may include backbone network 112, device 113, server 110, PON 101, PON 111, PON 119, device 116, device 117, or device 118, among other apparatuses that may be communicatively connected with each other. Device 116, device 117, or device 118 may be end consumer devices (e.g., router of a business or residence), which may be communicatively connected with one or more customer premise equipment (not shown). Each consumer end device may be within an area that may be capable of being serviced by one or more PONs. As shown, PON 101 may provide service to device 116 or device 117, among other devices (not shown) in area 114. PON 111 and PON 119 may provide service to device 117 or device 118, among other devices (not shown) in area 115. In FIG. 1, PON 101 displays an expanded view that includes possible components of a PON. PON 101 may include an optical line terminal (OLT) 103, which may be located at a service provider's central office (hub). In addition, PON 101 may include a number of optical network units (ONUs) (e.g., ONU 104-ONU 107) or optical network terminals (ONTs), that are located near end users. The use of PON 101 or PON 111 may reduce the amount of fiber and central office equipment required compared with point-to-point architectures.

The disclosed system may provide for a unified, rule-driven, and optimized approach to the reservation of PON bandwidth resources for ONUs with varying provisioned bandwidth parameters in their service profiles. ONU 104 on PON 101, and any other ONU on the PON, provides a single service for this example. A PON split ratio defines the maximum number of ONUs on PON 101. A service may be provisioned with bandwidth parameters in a service traffic descriptor (aka service profile) per ITU-T G.984.3 (GPON—Gigabit-capable Passive Optical Networks) and ITU-T G.9807.1 (XGS-PON—XGS-PON is a higher bandwidth, symmetric version of GPON) standards. Example parameters are shown in Table 1 below.

TABLE 1

$R_F$ - Fixed bandwidth: reserved portion of link capacity
$R_A$ - Assured bandwidth: portion of link capacity that is expected for allocation (beyond fixed bandwidth)
$R_M$ - Maximum bandwidth: upper limit on total bandwidth The below equation may define an overall traffic specification for utilization of capacity (C) of uplink interface for the ONUs (e.g., ONU 104-ONU 107) on PON 101. The maximum "i" is the split ratio defined for PON 101. The traffic specification that achieves "Assured" bandwidth under all conditions is based upon all "i" ONUs on a fully populated PON (maximum number of ONUs=PON split ratio) actively providing their specified Fixed and Assured bandwidth at the same time, while remaining below C (the uplink interface capacity).

$$\sum_i (R_F^i + R_A^i) \leq C \quad \text{(Equation 1)}$$

Figure 2:
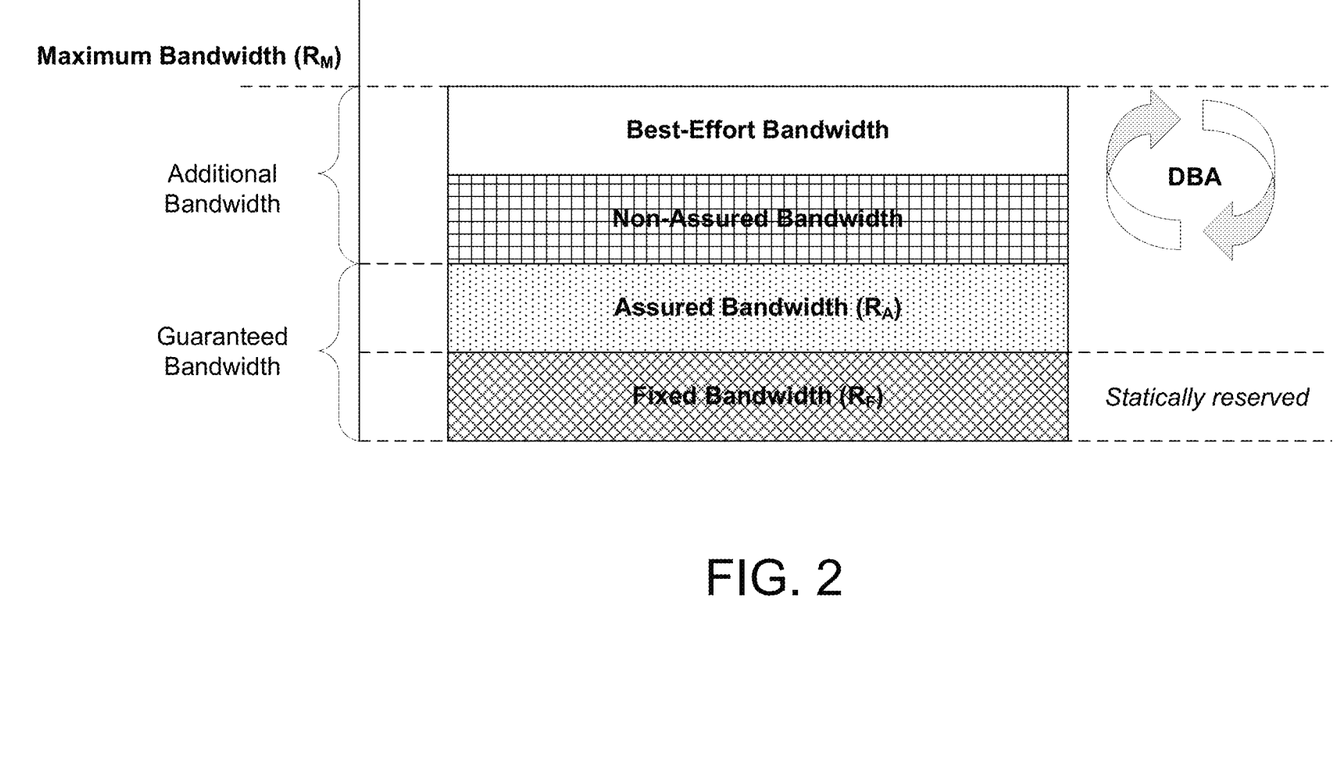
FIG. 2 illustrates an exemplary model of upstream bandwidth allocation.

FIG. 2 illustrates an exemplary model of upstream bandwidth allocation based upon a traffic descriptor that also specifies the indicator for additional bandwidth assignment—non-assured (NA) or best-effort (BE). The Dynamic Bandwidth Allocation (DBA) process may manage the allocation of assured bandwidth and additional bandwidth. Other parameters (not shown) may control assignment of non-assured or best effort bandwidth, and priority and weight of best-effort bandwidth.

Figure 3:
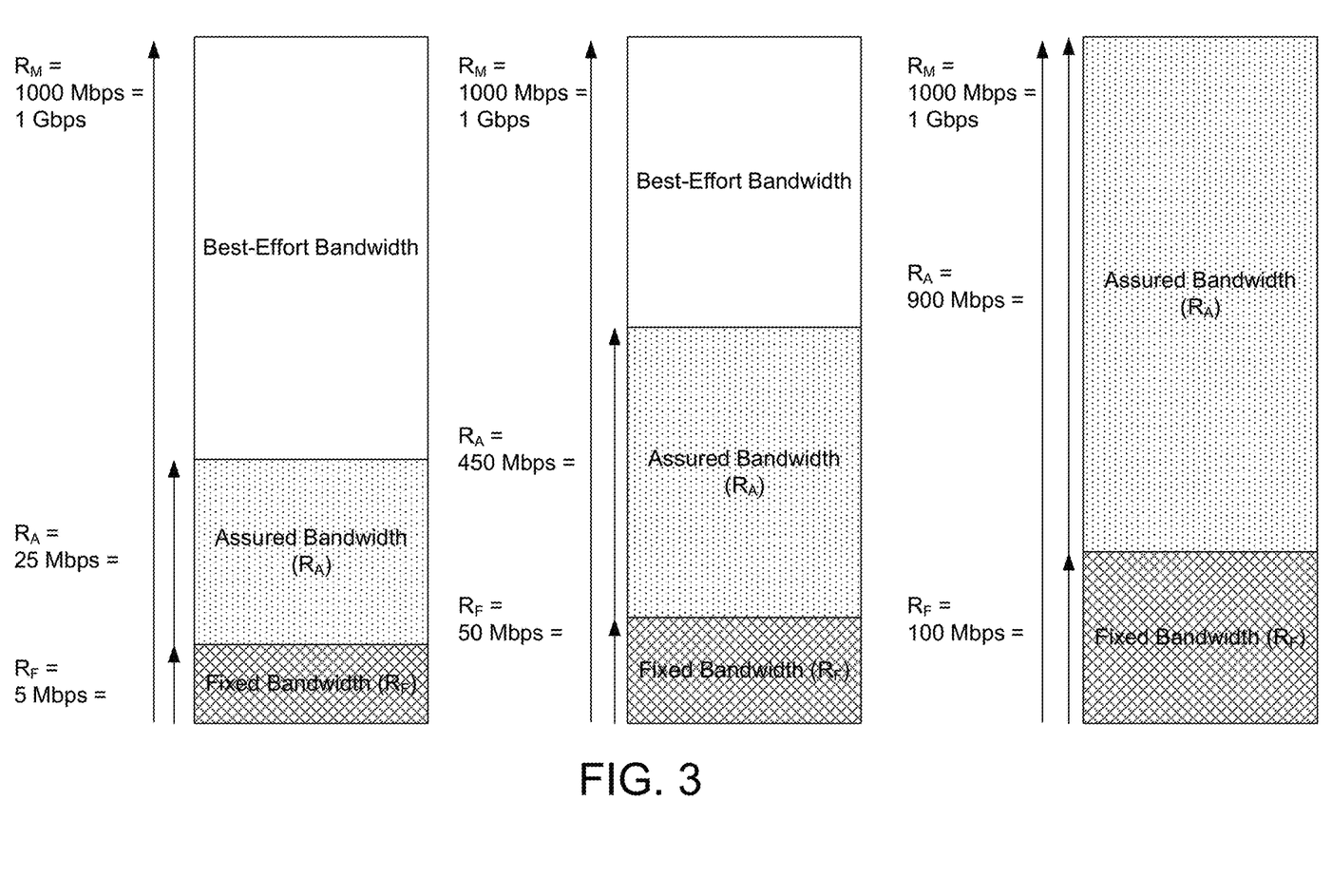
FIG. 3 illustrates an example set of service profiles.

FIG. 3 illustrates an example set of service profiles, and a varying mix of customers per service profile. The three example profiles ($P_x$) may be examined with respect to the PON capacity "C" as shown in Table 2. Table 2 shows several mixes of service profiles ($P_1$—Residential, $P_2$—Business, $P_3$—Premium) which demonstrate that a wide variety of mixes of service profiles can reach the maximum capacity "C" of the upstream PON bandwidth for an XGS-PON, for example. The PON split ratio for this XGS-PON example is 64. At the bottom of the table is an example amount of the assured bandwidth and fixed bandwidth total as shown in FIG. 3 for $P_1$, $P_2$, and $P_3$. Note that different profiles may be added to this table.

TABLE 2

| ONUs per Profile per PON | #($P_1$) | #($P_2$) | #($P_3$) | Total Customers per PON | Total Guaranteed Bandwidth |
|---|---|---|---|---|---|
| Mix #1 | 64 | 0 | 0 | 64 | 1.92 Gbps |
| Mix #2 | 32 | 14 | 0 | 46 | 7.96 Gbps |
| Mix #3 | 32 | 8 | 3 | 43 | 7.96 Gbps |
| Mix #4 | 32 | 2 | 6 | 40 | 7.96 Gbps |
| Mix #5 | 16 | 9 | 3 | 28 | 7.98 Gbps |
| Mix #6 | 16 | 1 | 7 | 24 | 7.98 Gbps |
| Mix #7 | 0 | 16 | 0 | 16 | 8 Gbps |
| Mix #8 | 0 | 8 | 4 | 12 | 8 Gbps |
| Mix #9 | 0 | 0 | 8 | 8 | 8 Gbps |
| | GB ($P_1$) = 30 Mbps | GB ($P_2$) = 500 Mbps | GB ($P_3$) = 1000 Mbps | | |

Figure 4:
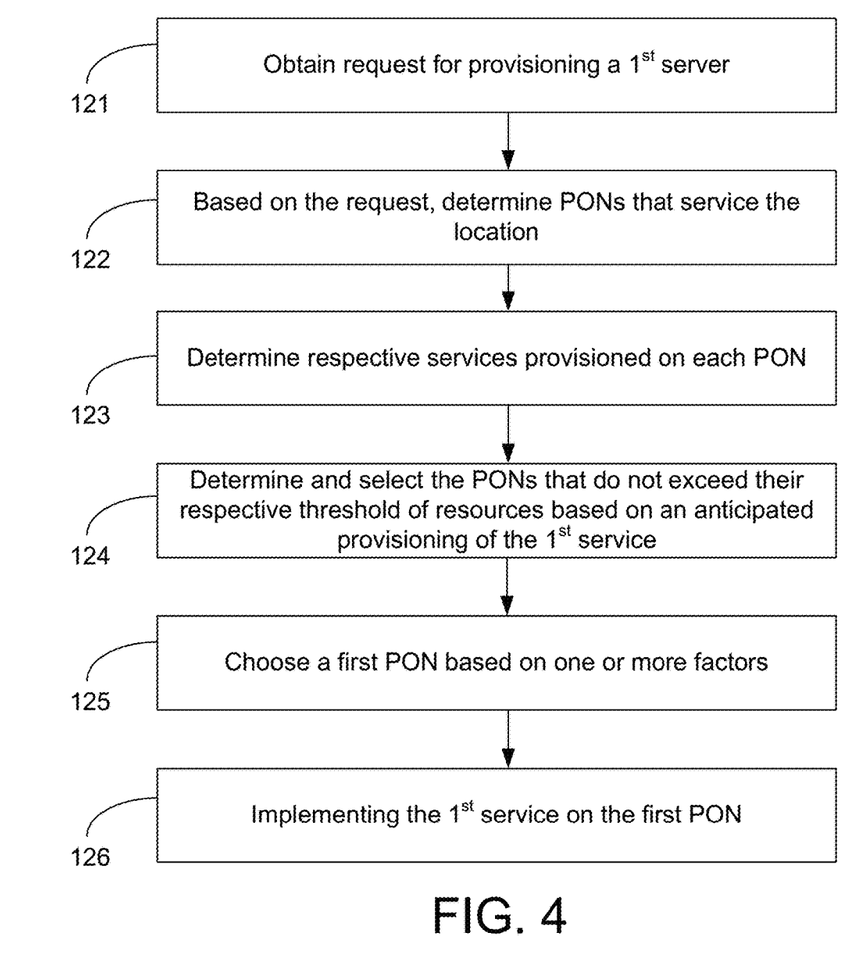
FIG. 4 illustrates an exemplary method for service bandwidth provisioning on passive optical networks.

FIG. 4 illustrates an exemplary method for service bandwidth provisioning on passive optical networks. At step 121, a request may be obtained (e.g., by server 110) for provisioning of a first service. The request may include information associated with the anticipated location of the service or the service is specified by the service profile, ($P_1$, $P_2$, $P_3$, or $P_x$). Location information may be GPS coordinates, street address, a threshold radius around a PON, or other derived information (e.g., fiber cable distance run). At step 122, based on the request of step 121, determine PONs that provide service for the location. At step 123, the respective services that are provisioned on each PON may be determined. For example, it may be determined that PON 101, PON 111, and PON 119 may provide service for the current location of device 117. PON 101 and PON 111, assuming C=8 Gbps, may have a mix of services as shown in Table 3 below, with reference to the XGS-PON example as provided in reference to Table 2.

TABLE 3

| PON | #($P_1$) | #($P_2$) | #($P_3$) | Available Bandwidth |
|---|---|---|---|---|
| PON 101 | 15 | 5 | 3 | 5.95 Gbps |
| PON 111 | 30 | 2 | 6 | 7.9 Gbps |
| PON 119 | 30 | 0 | 6 | 6.9 Gbps |
| | GB ($P_1$) = 30 Mbps | GB ($P_2$) = 500 Mbps | GB ($P_3$) = 1000 Mbps | |

With continued reference to FIG. 4, at step 124, there may be a determination of the PONs that do not exceed their respective threshold (e.g., GB of 8 Gbps) based on the anticipated provisioning of the first service. In other words, PONs have the available capacity to accommodate the first service. The service profile mix or the total guaranteed bandwidth (GB) of the service profile mix (see equation 1) may be considered. For example, the anticipated first service may have a service profile of $P_2$. Therefore, in this example, PON 101 and PON 119 would be selected as the PONs that do not exceed a threshold which may be C. PON 111 exceeds C if $P_2$ is added. At step 125, a first PON may ultimately be selected based on one or more factors. For example, factors may include a PON having the most available resources available (e.g., total non-allocated guaranteed bandwidth available) after an anticipated implementation of the first service, lowest fiber cable distance run, zoning (e.g., general anticipated need for residential or business), building permits, (e.g., more immediate anticipated need for residential or business), physical availability of PON fiber(s), or the lowest cost add to this service as a split from a PON fiber versus another (e.g., related to fiber and construction costs), among other things. At step 126, the first service may be automatically provisioned on the first PON (e.g., PON 101).

Figure 5:
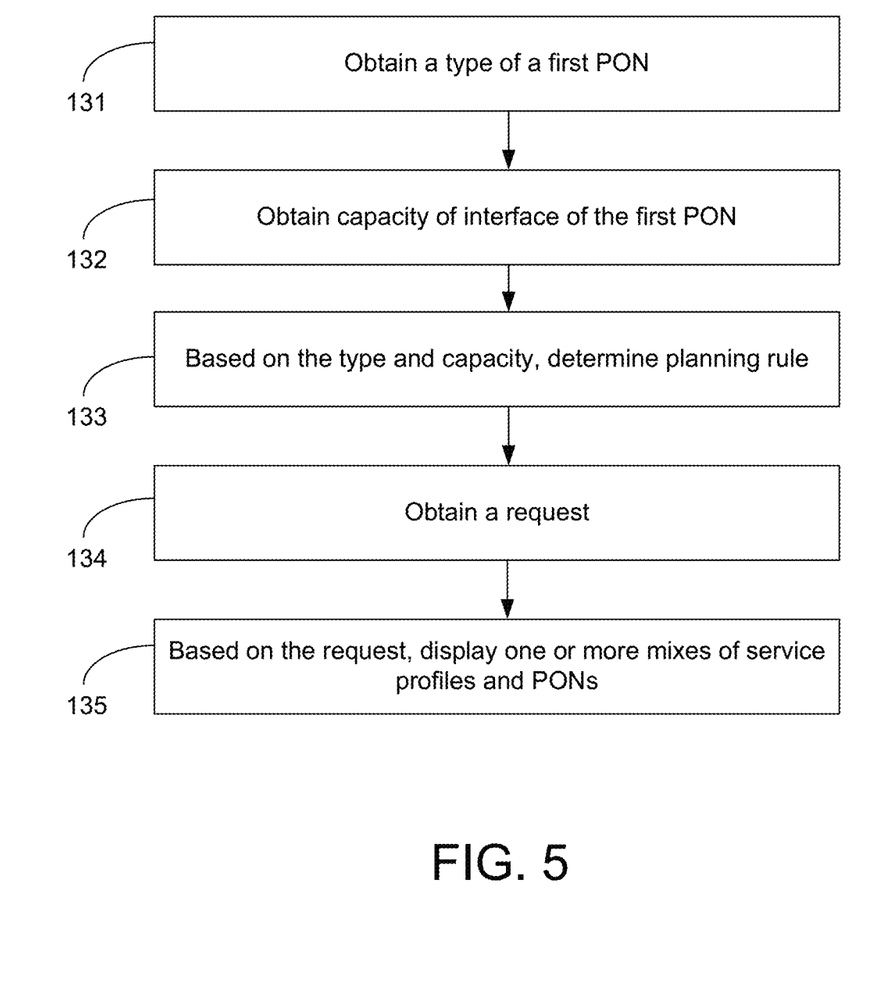
FIG. 5 illustrates an exemplary method for service bandwidth provisioning on passive optical networks.

FIG. 5 illustrates an exemplary method for service bandwidth provisioning or forecasting on passive optical networks. At step 131, a type of PON 101 may be obtained by server 110, which may include a global operation support system or the like. For example, the type may be whether it is a GPON, XGS-PON, XG-PON, or the like. At step 132, a capacity (C) of an interface (e.g., uplink interface) of PON 101 may be obtained. For example, an XGS-PON may have C equal to 8 Gbps. At step 133, based on the type (step 131) and capacity (step 132), a planning rule may be determined (e.g., Equation 1). The planning rule may be saved in server 110 some time before a request for a service profile or the like is initiated. At step 134, a request may be obtained (e.g., by server 110). The request may include information such as one or more locations or one or more service profiles (also referred herein as services). The location may be a mile radius or the like from a GPS coordinate or street address. At step 135, based on the request PONs and locations may be determined and instructions may be provided to display the determined PONs and locations. The display may be similar to Table 2, Table 3, a map with indicating PONs that available for different service profiles, or the like. PONs that are underutilized or near capacity may be highlighted. Further, rather than using just one PON to service a customer, a combination of PONs may be identified (e.g., PON 101 and PON 119) to be used and ultimately provisioned for a particular location. There may be a scenario where there is an attempt to find an address that will fit a plurality of service profiles, which may need to consider multiple PONs. The method of FIG. 5 may be used to plan and visualize the installation of PONs, the provisioning of future service profiles, or to indicate favorable areas for selling network services, or even selling real estate.

The disclosed subject matter delivers an approach to the reservation of PON bandwidth resources that may reduce the required number of PON fibers, as it increases utilization of a PON by more customers per PON, and thus reduce capital expense. Further, the disclosed subject matter may increase flexibility of mixing different services on PONs, thus it may increase the addressable customers and services in fiber serving areas.

It may enable the ability to analyze opportunities to add customers with varying service profiles on all PONs using big data analysis of the available resources on PONs and potential customer locations, whether residential customers, business customers, or other customers. This invention enables the ability to automate the intelligence to mix many customers with different Fixed, Assured, or Maximum bandwidth requirements.

As provided in some standards, the assured bandwidth parameter ($R_A$) applies only to the upstream direction. In the downstream direction, the Fixed bandwidth ($R_F$) can be specified, and the remainder of the bandwidth up to the Maximum bandwidth ($R_M$) downstream is allocated based upon the priority and weight parameters in the service profiles (traffic descriptors). Also, the sum of the $R_F$ for all ONUs may be less than the available downstream capacity, after removing PON protocol overhead, and after removing bandwidth for fixed services (e.g. for multicast). Therefore, with the use of some standards, the capacity of the PON based upon guaranteed bandwidth is based upon the upstream direction of the PON. It is contemplated herein that other configurations (e.g., other standards) with regard to upstream and downstream may be implemented in accordance with the disclosed systems and methods herein. Further, it is also contemplated that other planning rules may be used.

Figure 6:
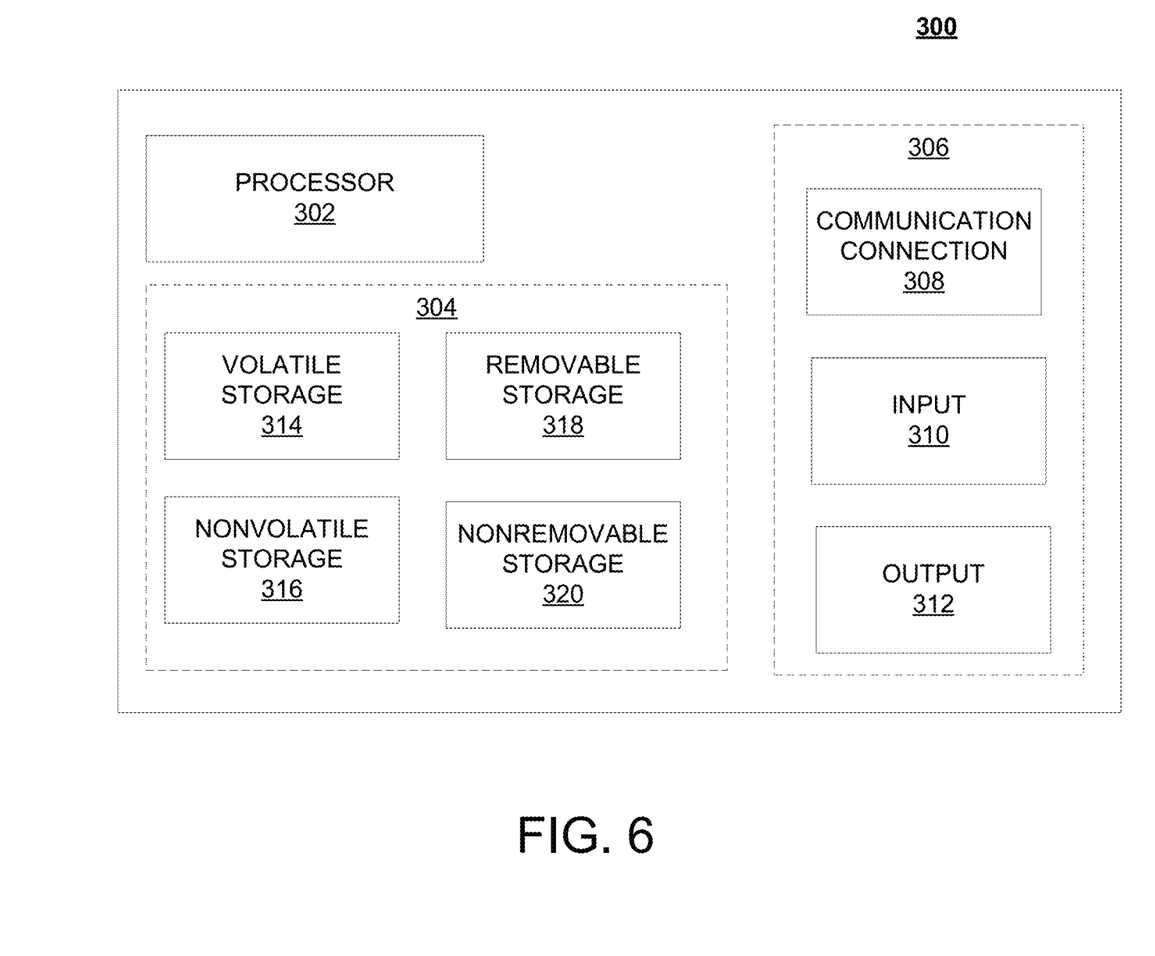
FIG. 6 illustrates a schematic of an exemplary network device.

FIG. 6 is a block diagram of network device 300 that may be connected to or comprise a component of provider network 100. Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 6) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
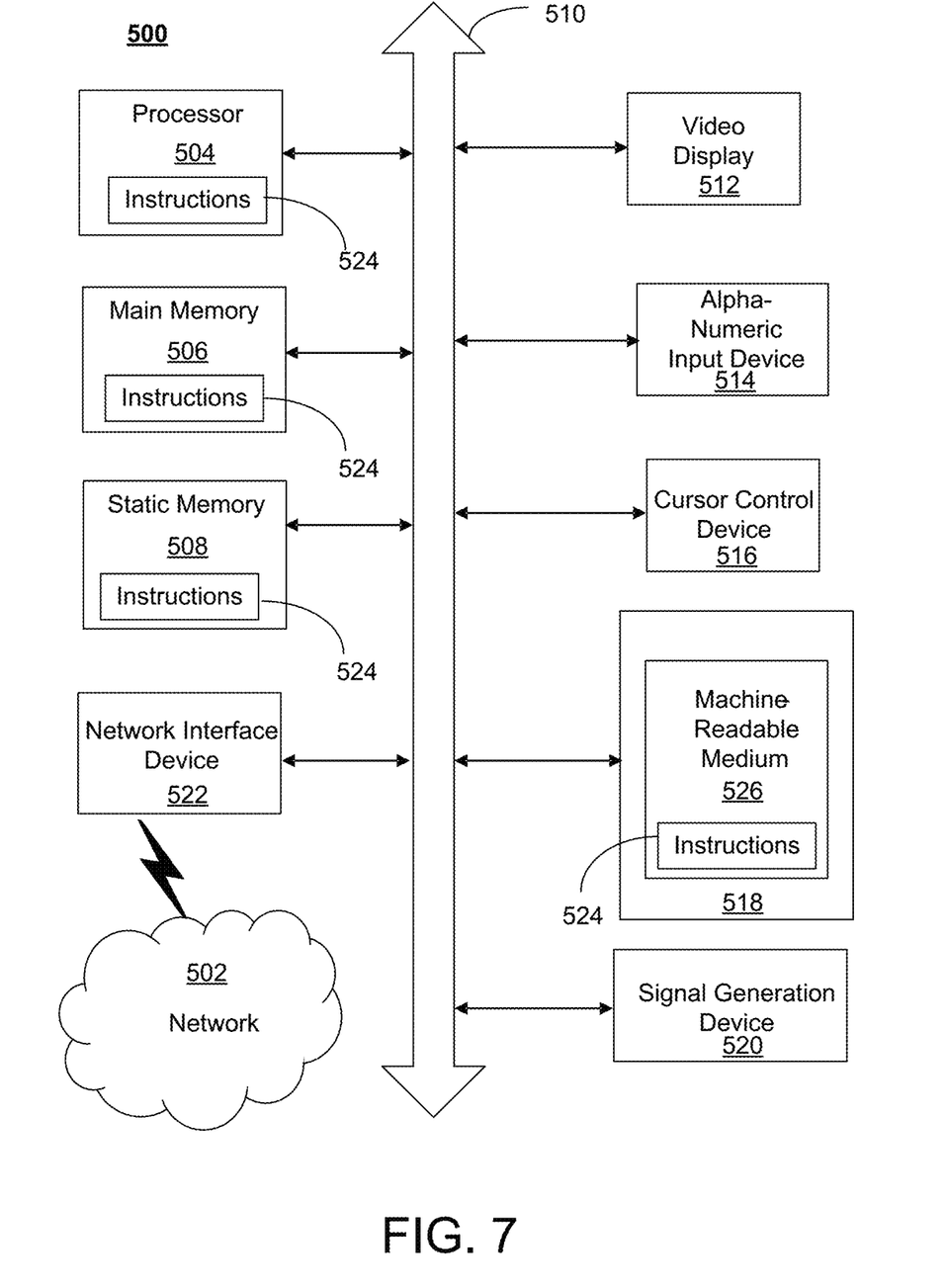
FIG. 7 illustrates an exemplary communication system that provides wireless telecommunication services over wireless communication networks.

FIG. 7 depicts an exemplary diagrammatic representation of a machine in the form of a computer system 500 within which a set of instructions, when executed, may cause the machine to perform any one or more of the methods described above. One or more instances of the machine can operate, for example, as processor 302, device 113, server 110, device 116, device 117, device 118, OLT 103, ONU 104, and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 526 on which is stored one or more sets of instructions (e.g., software 524) embodying any one or more of the methods or functions described herein, including those methods illustrated above. Software 524 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which alerts for service bandwidth provisioning on passive optical networks can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—service bandwidth provisioning on passive optical networks—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The methods, apparatus, systems disclosed herein may provide for automated provisioning or determination of available PONs. For example, system, apparatus, or method may include obtaining a request for provisioning a service (e.g., a service profile), wherein the request comprises a location; based on the request, determining passive optical networks (PONs) that are available for the location; determining a subset of the PONs that have the capacity to provision the service; selecting a first PON of the subset of PONs based on one or more factors, wherein the one or more factors comprises guaranteed bandwidth; and automatically provisioning the service on the first PON. The factors may include length of fiber run between the location and the first PON, the most non-allocated total guaranteed bandwidth of the subset of the PONs, least non-allocated total guaranteed bandwidth of the subset of the PONs, zoning associated with the location, or building permits associated with the location, among other things. The subset of the PONs may be displayed on the map include the one or more factors among other things. In another example, a system, apparatus, or method may include obtaining a request for provisioning a service, wherein the request comprises a location; based on the request, determining a first subset of PONs of the plurality of PONS that are available for the location; obtaining service profiles from the first subset of PONs that are available for the location; determining a second subset from the first subset of PONs that have the capacity to provision the service based on the obtained service profiles; selecting a first PON of the second subset of PONs based on one or more factors, wherein the one or more factors comprises guaranteed bandwidth; and provisioning the service on the first PON. In yet another example, a system, apparatus, or method may include obtaining a request for availability of one or more passive optical networks (PONs), wherein the request comprises a location and a plurality of service profiles; based on the request, determining a first subset of PONs that are available for the location; determining a second subset of the PONs that have the capacity to provision the plurality of service profiles; obtaining information associated with the second subset of PONs, the information comprising service profiles for the subset of PONs; and providing instructions to display a map of the second subset of PONs. Further, the request may include length of fiber run between the location and the first PON, a threshold allocation of minimum total guaranteed bandwidth of each PON of the one or more PONs, or a threshold allocation of maximum total guaranteed bandwidth of each PON the one or more PONs, among other things. The map may include information such as zoning, building permits, total guaranteed bandwidth of each PON, fiber run length to a location from a PON, or the like. All combinations in this paragraph (including the removal or addition of steps) are contemplated in a manner that is consistent with the other portions of the detailed description.

What is claimed:

1. An apparatus comprising: a processor; and
a memory coupled with the processor, the memory storing executable instructions that when executed by the processor cause the processor to effectuate operations comprising:
obtaining a request for provisioning a service, wherein the request comprises a location;
based on the request, determining passive optical networks (PONs) that are available for the location;
determining a subset of the PONs that have capacity to provision the service; selecting a first PON of the subset of PONs based on one or more factors, wherein the one or more factors comprises the first PON having the least non-allocated guaranteed bandwidths of the subset of PONs: and provisioning the service on the first PON.

2. The apparatus of claim 1, wherein the one or more factors comprises length of fiber run between the location and the first PON.

3. The apparatus of claim 1, wherein the one or more factors comprises upstream bandwidth allocation of the subset of the PONs.

4. The apparatus of claim 1, wherein the one or more factors comprises downstream bandwidth allocation of the subset of the PONs.

5. The apparatus of claim 1, wherein the one or more factors comprises zoning associated with the location.

6. The apparatus of claim 1, wherein the one or more factors comprises building permits associated with the location.

7. The apparatus of claim 1, the operations further comprising displaying the subset of the PONs on a map that indicates the one or more factors.

8. A system comprising:
a plurality of passive optical networks (PONs); and
a server communicatively connected with the plurality of PONs, the server comprising: a processor; and
a memory coupled with the processor, the memory storing executable instructions that when executed by the processor cause the processor to effectuate operations comprising:
   obtaining a request for provisioning a service, wherein the request comprises a location;
   based on the request, determining a first subset of PONs of the plurality of PONs that are available for the location;
   obtaining service profiles from the first subset of PONs that are available for the location;
   determining a second subset from the first subset of PONs that have capacity to provision the service based on the obtained service profiles;
   selecting a first PON of the second subset based on one or more factors, wherein the one or more factors comprises the first PON having the least non-allocated guaranteed bandwidths of the second subset: and provisioning the service on the first PON.

9. The system of claim 8, wherein the one or more factors comprises length of fiber run between the location and the first PON.

10. The system of claim 8, wherein the one or more factors comprises upstream bandwidth allocation of the second subset.

11. The system of claim 8, wherein the one or more factors comprises downstream bandwidth allocation of the second subset.

12. The system of claim 8, wherein the one or more factors comprises a zoning associated with the location.

13. The system of claim 8, wherein the one or more factors comprises building permits associated with the location.

14. The system of claim 8, the operations further comprising displaying the second subset on a map that indicates the one or more factors.

15. A computer readable storage medium storing computer executable instructions that when executed by a computing device cause said computing device to effectuate operations comprising:
   obtaining a request for provisioning a service, wherein the request comprises a location;
   based on the request, determining passive optical networks (PONs) that are available for the location;
   determining a subset of the PONs that have capacity to provision the service;
   selecting a first PON of the subset of PONs based on one or more factors, wherein the one or more factors comprises the first PON having the least non-allocated guaranteed bandwidths of the subset of PONs; and
   provisioning the service on the first PON.

16. The computer-readable storage medium of claim 15, wherein the one or more factors comprises length of fiber run between the location and the first PON.

17. The computer-readable storage medium of claim 15, wherein the one or more factors comprises upstream bandwidth allocation of the subset of the PONs.

18. The computer-readable storage medium of claim 15, wherein the one or more factors comprises downstream bandwidth allocation of the subset of the PONs.

19. The computer-readable storage medium of claim 15, wherein the one or more factors comprises zoning associated with the location.

20. The computer-readable storage medium of claim 15, wherein the one or more factors comprises building permits associated with the location.

* * * * *